United States Patent [19]

Aoki et al.

[11] Patent Number: 4,916,977
[45] Date of Patent: Apr. 17, 1990

[54] AUTOMATIC TRANSMISSION

[75] Inventors: Hideyuki Aoki, Anjo; Masakatsu Miura, Kariya, both of Japan

[73] Assignee: Aisin-Warner Kabushiki Kaisha, Anjo, Japan

[21] Appl. No.: 83,498

[22] Filed: Aug. 6, 1987

[30] Foreign Application Priority Data

Aug. 11, 1986 [JP] Japan .................................. 61-188229

[51] Int. Cl.$^4$ ............................................. F16H 37/08
[52] U.S. Cl. ............................................. 475/205; 475/283
[58] Field of Search ................. 74/695, 760, 761, 766, 74/740, 701, 705

[56] References Cited

U.S. PATENT DOCUMENTS

| | | | |
|---|---|---|---|
| 2,894,415 | 7/1959 | Miller | 74/761 X |
| 3,877,320 | 4/1975 | Iijima | 76/761 X |
| 4,258,586 | 3/1981 | Numazawa et al. | 74/695 |
| 4,528,869 | 7/1985 | Kubo et al. | 74/695 |
| 4,537,092 | 8/1985 | Morisawa | 74/695 |
| 4,594,914 | 6/1986 | Kubo et al. | 74/695 X |
| 4,711,138 | 12/1987 | Miura et al. | 74/761 |
| 4,716,787 | 1/1988 | Miura et al. | 74/761 |
| 4,722,242 | 2/1988 | Miura et al. | 74/695 |
| 4,813,301 | 3/1989 | Aoki | 74/760 X |
| 4,817,462 | 4/1989 | Dach et al. | 74/740 |
| 4,833,943 | 5/1989 | Buckseh | 74/695 X |

FOREIGN PATENT DOCUMENTS

WO85/05666 12/1985 Int'l Pat. Institute ................. 74/740

OTHER PUBLICATIONS

RT-910 10-Speed Road Ranger and Family of Twin Countershaft Transmissions, Eaton Manu. Co. 1962 (p. 4).

Primary Examiner—Dwight G. Diehl
Assistant Examiner—Chris Campbell
Attorney, Agent, or Firm—Kanesaka and Takeuchi

[57] ABSTRACT

Automatic transmission including a main-transmission-mechanism consisting of two planetary gear units (three speed or four speed transmission mechanism for example) and a sub-transmission-mechanism consisting of one planetary gear unit (underdrive mechanism, for example). One speed and two speed for the whole transmission are obtained, with a low speed stage of the main-transmission-mechanism lower than two speed, by shifting the main-transmission-mechanism to one and two speed, respectively, while the sub-transmission-mechanism is kept at low speed (underdrive). And three speed for the whole transmission is obtained by shifting the sub-transmission-mechanism to high speed (direct coupling) while the main-transmission-mechanism is left at the two speed state. Further, four speed or five speed for the whole is obtained by shifting the main-transmission-mechanism to three speed or, if it is of four speed type, to four speed, respectively, while the sub-transmission-mechanism is kept at the high speed state.

4 Claims, 5 Drawing Sheets

FIG.1

| Whole | Main-transmission-mechanism | Sub-transmission-mechanism |
|---|---|---|
| 1 ST | one speed | low speed |
| 2 ND | two speed | low speed |
| 3 RD | two speed | high speed |
| 4 TH (O/D) | three speed | high speed |

FIG.2

| Whole | Main-transmission-mechanism | Sub-transmission-mechanism |
|---|---|---|
| 1 ST | one speed | low speed |
| 2 ND | two speed | low speed |
| 3 RD | two speed | high speed |
| 4 TH | three speed | high speed |
| 5 TH (O/D) | four speed | high speed |

FIG. 4

| POSITION | | CLUTCH | | | | BRAKE | | | | O.W.C | | | |
|---|---|---|---|---|---|---|---|---|---|---|---|---|---|
| | | C₀ | C₁ | C₂ | C₃ | B₁ | B₂ | B₃ | B₄ | F₀ | F₁ | F₂ | F₃ |
| P | | | | | | | | | ○ | | | | |
| R | STOP | | | ○ | | | | ○ | ○ | | | | |
| | RUN | | | ○ | | | | × | ○ | | | | |
| N | | | | | | | | | ○ | | | | |
| D | idle | | △ | | | ○ | | | ○ | | | | |
| D | 1ST | | ○ | | | | | | ○ | | | ○ | ○ |
| D | 2ND | | ○ | | | | ○ | | ○ | | ○ | | ○ |
| D | 3RD | | ○ | | ○ | | ○ | | | | ○ | | |
| D | 4TH | ○ | ○ | | ○ | | ○ | | | ○ | | | |
| D | 5TH | ○ | | | ○ | ○ | ○ | | | | | | |
| 3 | 1ST | | ○ | | | | | ○ | | | | ○ | ○ |
| 3 | 2ND | | ○ | | | | ○ | ○ | | | ○ | | ○ |
| 3 | 3RD | ○ | ○ | | | | ○ | ○ | | ○ | | | ○ |
| 3 | 4TH | ○ | | | | ○ | ○ | ○ | | | | | ○ |
| 2 | 1ST | | ○ | | | | | ○ | ○ | | | ○ | ○ |
| 2 | 2ND | | ○ | | ○ | | ○ | | | | | ○ | |
| 2 | (2ND) | | ○ | | | | ○ | ○ | ○ | | ○ | | ○ |
| 2 | (3RD) | | ○ | | ○ | | ○ | ○ | | | ○ | | |
| 1 | 1ST | | ○ | | | | | ○ | ○ | | | ○ | ○ |
| 1 | (2ND) | | ○ | | ○ | | | ○ | | | | ○ | |
| 1 | (3RD) | | ○ | | ○ | | ○ | ○ | | | ○ | | |

| REMARKS | | |
|---|---|---|
| ○ | SUPPLY | |
| × | RELEASE | |
| △ | PRESSURE REDUCTION | |

FIG.6

| POSITION | | CLUTCH | | | BRAKE | | | | O.W.C | | |
|---|---|---|---|---|---|---|---|---|---|---|---|
| | | $C_1$ | $C_2$ | $C_3$ | $B_1$ | $B_2$ | $B_3$ | $B_4$ | $F_1$ | $F_2$ | $F_3$ |
| P | | | | | | | | ○ | | | |
| R | STOP | | ○ | | | | ○ | ○ | | | |
| | RUN | | ○ | | | | × | ○ | | | |
| N | | | | | | | | ○ | | | |
| D | idle | △ | | | ○ | | | ○ | | | |
| D | 1ST | ○ | | | | | | ○ | | ○ | ○ |
| | 2ND | ○ | | | | ○ | | ○ | ○ | | ○ |
| | 3RD | ○ | | ○ | | ○ | | ○ | | ○ | |
| | 4TH | ○ | ○ | ○ | ○ | | | | | | |
| 3 | 1ST | ○ | | | | | | ○ | ○ | ○ | ○ |
| | 2ND | ○ | | | | ○ | | ○ | ○ | | ○ |
| | 3RD | ○ | ○ | | | ○ | | ○ | | | ○ |
| 2 | 1ST | ○ | | | | | ○ | ○ | | ○ | ○ |
| | 2ND | ○ | | ○ | | | ○ | | | ○ | |
| | (2ND) | ○ | | | ○ | ○ | | ○ | ○ | | ○ |
| | (3RD) | ○ | | ○ | ○ | ○ | | | ○ | | |
| 1 | 1ST | ○ | | | | | ○ | ○ | | ○ | ○ |
| | (2ND) | ○ | | ○ | | ○ | | | | ○ | |
| | (3RD) | ○ | | ○ | ○ | ○ | | | ○ | | |
| REMARKS | | ○ | SUPPLY | | | | | | | | |
| | | × | RELEASE | | | | | | | | |
| | | △ | PRESSURE REDUCTION | | | | | | | | |

AUTOMATIC TRANSMISSION

BACKGROUND OF THE INVENTION

1. Field of the Invention

This invention relates to an automatic transmission, particularly to an automatic transmission for an automobile which is used together with a torque converter and more particularly to an automatic transmission comprising a main-transmission-mechanism such as three speed or four speed transmission mechanism and a sub-transmission-mechanism such as underdrive mechanism.

2. Description of the Prior Art

It has previously been proposed to connect a high-and-low two speed sub-transmission-mechanism including an underdrive mechanism or an overdrive mechanism consisting of one planetary gear unit with a main-transmission-mechanism of forward three speed consisting of two planetary gears so as to provide an automatic transmission of forward four speed well-known as an overdrive automatic transmission.

With this automatic transmission, one, two and three speeds as a whole are obtained by shifting the main-transmission-mechanism to one, two and three speed, respectively, while the sub-transmission-mechanism is kept at the low speed stage ( underdrive of the underdrive mechanism or direct coupling of the overdrive mechanism ) ; and further, overdrive four speed is obtained by shifting the sub-transmission-mechanism to the high speed stage ( direct coupling of the underdrive mechanism, overdrive of the overdrive mechanism ) while the main-transmission-mechanism is kept at three speed.

By the way, the structure of sub-transmission-mechanism consisting of a planetary gear ( underdrive mechanism, overdrive mechanism ) does not allow the transmission ratio to be set at not less than a certain value (0.75). In addition to this limitation, when considering problems associated with installation on vehicles, said value is subject to further limitations ( about 0.71 ).

Consequently, conventional four speed automatic transmission is restricted by the problem that the gear ratio range for the transmission stages of the sub-transmission-mechanism, namely, the gear ratio range for changing between three speed and four speed ( overdrive ) is subject to limitations, which sometimes causes problems in designing the optimum setting of gear ratio range throughout four speeds and satisfying both running performance and fuel efficiency.

SUMMARY OF THE INVENTION

It is therefore an object of the present invention to overcome the foresaid problem by obtaining the optimum gear ratio for the whole transmission through an organic combination of a main-transmission-mechanism and a sub-transmission-mechanism.

The present invention is proposed under the foresaid circumstances. According to a feature of the present invention, in an automatic transmission comprising a main-transmission-mechanism consisting of two planetary gear units and a sub-transmission-mechanism consisting of one planetary gear unit; low-speed range transmission stages are obtained, with a low speed stage lower than a certain speed ( two speed, for example ) of the main-transmission-mechanism, by shifting the main-transmission-mechanism while the sub-transmission-mechanism is kept at low speed and high speed range transmission stages are obtained, with a high speed stage higher than the certain speed of the main-transmission-mechanism, by shifting the main-transmission-mechanism while the sub-transmission-mechanism is kept at high speed; and further, an intermediate speed stage is obtained by shifting the sub-transmission-mechanism from low speed to high-speed while the main-transmission-mechanism is kept at said certain speed, as illustrated in FIGS. 1 and 2.

If, by an automobile employing the transmission mechanism above, a car starts in D range, the main-transmission-mechanism is shifted to one speed and to two speed while the sub-transmission-mechanims ( underdrive mechanism, for example ) is kept at low speed ( underdrive ), providing one speed and two speed as a whole automatic transmission. And further, the sub-transmission-mechanism is shifted to high speed ( direct coupling ) while the main-transmission-mechanism is left at two speed, providing three speed as an automatic transmission. Still further, four speed or five speed as a whole is obtained by shifting the main-transmission-mechanism to three speed or, if it is of four speed type, to four speed, respectively, while the sub-transmission-mechanism is kept at high speed.

BRIEF DESCRIPTION OF THE DRAWINGS

FIG. 1 and FIG. 2 are diagrams illustrating combinations of main-transmission-mechanism and sub-transmission-mechanism in accordance with the present invention.

FIG. 4 illustrates the operation of the embodiment shown in FIG. 3.

FIG. 6 illustrates the operation of the embodiment shown in FIG. 5.

DESCRIPTION OF THE PREFERRED EMBODIMENT

The following is a description of embodiments in accordance with the present invention.

Figure 3:
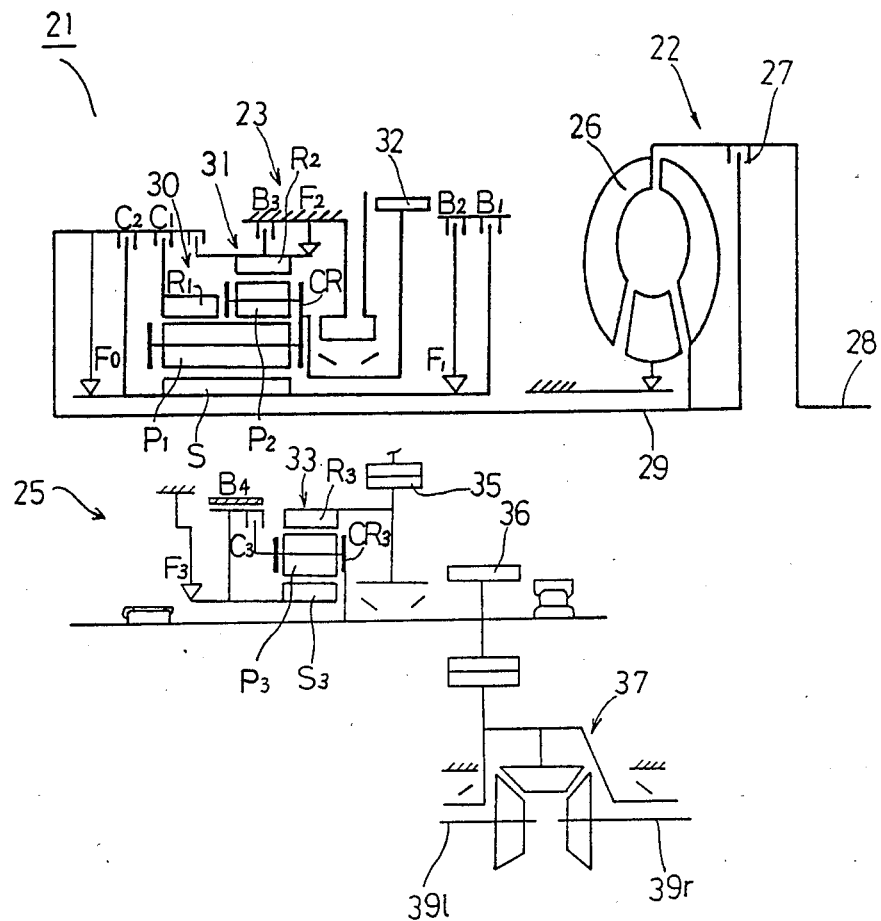
FIG. 3 is a diagramatic view of an embodiment in accordance with the present invention.

A five speed automatic transmission 21 comprises a torque converter portion 22, a four speed automatic transmission mechanism portion 23 and an underdrive mechanism portion 25, as shown in FIG. 3.

The torque converter portion 22 includes a torque conveter 26 and a lock-up clutch 27. Rotation of the engine crankshaft 28 is coupled with the input shaft 29 through the oil flow by the torque converter 26 or through a mechanical coupling by the lock-up clutch 27.

The four speed automatic transmission mechanism portion 23 includes a single planetary gear unit 30 and a dual planetary gear unit 31. Each gear unit has a carrier CR and a sun gear S. These carriers CR are coupled with respect to each other as an integrated body; and these sun gears are coupled with respect to each other as an integrated body, too. In this embodiment, both the planetary gears 30, 31 of the single and dual planetary gear units have a common sun gear and a long pinion is employed as the first pinion $P_1$ engaging with the sun gear S of the dual unit 31 and as the pinion of the single unit 30 in common; and further, the second pinion $P_2$ engaging with a ring gear $R_2$ consists of a short pinion which provides no interference with a ring gear $R_1$ of the single unit. Still further, the input shaft is coupled with the ring gear $R_1$ of the single planetary gear unit 30 through the first (forward) clutch $C_1$ and also coupled with the sun gear S through the second (direct) clutch $C_2$; and, the sun gear S is braked directly by the first (2nd coast) brake $B_1$ and the rotation of the sun gear S in one direction is regulated by the second (2ND) brake $B_2$ through the first one-way clutch $F_1$; and, the ring gear $R_2$ of the dual planetary gear unit 31 is braked directly by the third (1ST & Rev) brake $B_3$ and the rotation of the ring gear $R_2$ in one direction is regulated by the second one-way clutch $F_2$. Furthermore, the input shaft 29 is coupled with the ring gear $R_2$ of the dual planetary gear 31 through the third (overdrive) clutch $C_0$ and the third one-way clutch $F_0$ is arranged between the input shaft and the sun gear S in order to so regulate that the rotation of the sun gear S does not exceed that of the input shaft 29. Further, the carrier CR is coupled with the counter drive gear 32 which is as the output member of the four speed automatic transmission mechanism portion 23.

On the other hand, the underdrive mechanism portion 25 consists of a single planetary gear unit 33, the ring gear $R_3$ of which is coupled with a counterdriven gear 35 which is always engaging with said counterdrive gear 32; and the carrier $CR_3$ supporting the pinion $P_3$ is coupled with the output pinion 36. Further, the rotation of the sun gear $S_3$ in one direction is regulated by the fourth one-way clutch $F_3$; and the sun gear $S_3$ is braked by the fourth (underdrive) brake $B_4$ and is coupled with the carrier $CR_3$ through the fourth (underdrive direct) clutch $C_3$.

As for the output pinion 36, it is coupled with the right and left axles 39r, 39l through the differential device 37.

Now, the operation of this embodiment is as follows.

With one speed state in D range, the first (forward) clutch $C_1$ is put in coupling state and the fourth brake $B_4$ operates, as shown in FIG. 4. Consequently, the rotation of the input shaft 29 is transferred to the ring gear $R_1$ of the single unit 30, and in this state, the second one-way clutch $F_2$ prevents the ring gear $R_2$ of the dual unit 31 from rotating, resulting in a great reductive rotation of the common carrier CR in the positive direction with the reverse rotation of the sun gear S, and said reductive rotation is transferred to the counterdriven gear 35 of the underdrive (U/D) mechanism portion 25 through the counterdrive gear 32. Here, the U/D mechanism portion 25 is kept in underdrive state due to the working of the fourth brake $B_4$ and the fourth one-way clutch $F_3$. Thus, one speed for the whole automatic transmission 21 is obtained by the combination of the one speed state of the four speed automatic transmission 23, and the underdrive state of the U/D mechanism portion 25.

Further, with two speed state in D range (2ND), the second brake $B_2$ works in addition to the connection of the first clutch $C_1$, with the result that the rotation of the sun gear S is stopped by the working of the first one-way clutch $F_1$ based on the working of said brake $B_2$. Thus, the rotation of the ring gear $R_1$ transferred from the input shaft 29 gives the ring gear $R_2$ of the dual unit 31 racing in the positive direction and, at the same time, gives the carrier CR reductive rotation in the positive direction which is transfered to the counterdriven gear 35 of the U/D mechanism portion 25 through the counterdrive gear 32. Here, U/D mechanism portion 25 is kept in underdrive state. Thus, two speed for the automatic transmission is obtained by the combination of the two speed state of the four speed automatic transmission mechanism 23 and the underdrive state of the U/D mechanism.

Still further, with three speed state (3RD) in D range, the fourth (underdrive direct) clutch $C_3$ is put in connection state and the fourth (underdrive) brake $B_4$ is released, with the result that U/D mechanism portion 25 is put in direct coupling state while the four speed automatic trasmission mechanism portion 23 is left in the two speed state. Thus three speed for the whole automatic transmission 21 is obtained by the combination of the two speed of the automatic transmission mechanism 23 and the direct coupling of the U/D mechanism portion 25.

Still more further, with four speed state (4TH) in D range, the third clutch $C_0$ is put in connection in addition to the connection of the first(forward) clutch $C_1$, connection of the fourth clutch $C_3$ and the working of the second brake $B_2$, with the result that the rotation of the input shaft 29 is transferred to the ring gear $R_1$ of the single unit 30 through the clutch $C_1$, and, at the same time, to the ring gear $R_2$ of the dual unit 31 through the clutch $C_0$. Thus, the respective elements of both planetary gear units rotate as an integrated body and the rotation is transferred to the counterdrive gear 32 from the carrier CR, wherein the rotating speed of the counterdrive gear becomes equal to that of the input shaft 29. Accordingly, four speed for the whole automatic transmission 21, with rotating speed equal to that of the input shaft 29, is obtained as the output of the output pinion 36 through the combination of the rotation of said drum gear 32 and the direct coupling state of the U/D mechanism portion 25.

Furthermore, with fifth speed state (5TH) in D range, the first clutch $C_1$ is released from the four speed state and, at the same time, the first brake $B_1$ works, with the result that the rotation of the input shaft 29 is transferred to the ring gear $R_2$ of the dual unit 31 through the clutch $C_0$. In this state, the sun gear S is kept stopped, and the carrier CR rotates at high speed while rotating the single unit ring gear $R_1$ at an increasing speed, said high speed rotation being transferred to the counterdrive gear 32 as overdrive (O/D). Thus, five speed for the whole automatic transmission is obtained by the combination of said O/D rotation and the U/D mechanism portion 25 which is kept in direct coupling state.

Now, more detailed description is as follows.

On the occasion of the up-shift from four speed to five speed, the release of the clutch $C_1$ precedes before the working of the first brake $B_1$. The third one-way clutch $F_0$, however, prevents the sun gear S from rushing in the accelerative direction, thereby easing the working timing of the first clutch $C_1$ and the first brake $B_1$, and also, preventing shift shocks due to the changing in engagement relation to provide a smooth shifting. In a similar way, on the occasion of the down-shift from five speed to four speed, the release of the first brake $B_1$ prevents the rotating speed of the sun gear S from exceeding that of the input member 29, providing a smooth shifting.

When the vehicle stops (idle), the oil pressure applied to the hydraulic servo for the first (forward) clutch $C_1$ is so controlled as to be reduced to that just before the engagement of the clutch and, at the same time, the first brake $B_1$ is worked. Thus, the input shaft 29 becomes free and under non-load creeping of the vehicle is avoided. And besides, on the occasion of changing to one speed (1ST), the clutch $C_1$ can be engaged without delay. In addition to these, the engagement of the first brake $B_1$ prevents the vehicle from backing up on a slope.

Still further, when a manual valve is changed from neutral (N) range to reverse (R) range, with the vehicle stopped or running at a very low speed ( lower than 7/km/H ), the second clutch $C_2$ is kept in the connection state and the third brake $B_3$ is working in the automatic transmission 21. Thus, the rotation of the input shaft 29 is transferred to the sun gear S through the clutch $C_2$, and, since the ring gear $R_2$ of the dual unit 31 is kept fixed due to the working of the third brake $B_3$ under this condition, the carrier CR is reversed as well as the ring gear $R_1$ of the single unit 30 is required, the reversal rotation of the carrier being transferred from the counterdrive gear 32 to the U/D mechanism portion 25 which is in the U/D state.

On the other hand, on the occasion of changing from N range to R range, with the vehicle advancing at a speed higher than a certain speed (7 km/H), the third brake is released, thereby avoiding the change-over to R range while the vehicle running.

Next, in case of the changing of the manual valve to 3 range through operation of a shift lever or a switch means, the gear ratio in three range differs from that in D range with respect to three speed (3RD) and four speed (4TH), although there is no difference between D range and 3 range with respect to one speed (1ST) and two speed (2ND).

That is, under the three speed state in 3 range, the first clutch $C_1$ and the third clutch $C_0$ are in connection, respectively, and, at the same time, the second brake $B_2$ and the fourth brake $B_4$ works. Accordingly, the four speed automatic transmission mechanism portion 23 is put in the direct coupling state and, at the same time the U/D mechanism portion 25 comes to the underdrive state, the combination of these states providing three speed in 3 range. Generally, in this state, the gear ratio is set higher than that of three speed in D range, with the result that the engine brake works more effectively and acceleration performance is raised.

Next, in the four speed state in 3 range, the first clutch $C_1$ is released from the third speed state, with the result that the third clutch $C_0$ is put in connection in the automatic transmission 21 and, at the same time, the first, the second and the third brakes $B_1$, $B_2$ and $B_4$ work. Thus, the four speed automatic transmission mechanism portion 23 is put in the overdrive state and, at the same time, the U/D mechanism portion 25 comes to the underdrive state, the combination of these states providing three speed in 3 range.

Generally, in this state, the gear ratio is higher than that of four speed in D range.

Further, in the one speed state (1ST) in 2 range which is realized by changing the manual valve, the third brake $B_3$ works in addition to the one speed state in D range. Thus, although the gear ratio is equal to that of one speed in D range, while the engine brake is working ( input-output reversal ) in 2 range the ring gear $R_2$ is held in the fixed state due to the brake $B_2$ and the one speed state is maintained, in contrast with the case of D range where one-way clutch $F_2$ cuts off the power transmission to provide the racing state.

Still further, in the two speed state (2ND) in 2 range, the first and the fourth clutches $C_1$, $C_3$ are in connection, respectively, and, at the same time, the third brake $B_3$ works. Thus, the four speed automatic transmission mechanism portion 23 is put in the one speed state, and, at the same time, the U/D mechanism portion 25 comes to the direct coupling state, the combination of these states providing two speed in 2 range. Generally, in this state, the gear ratio is set higher than that of each two speed in D range and 3 range. Besides, in this occasion, the third brake $B_3$ works the same as in one speed and engine-braking does not disturb the two speed state. And besides, two speed (2ND) and three speed (3RD) similar to the case of D range can be realized in 2 range, as mentioned in brackets.

Still further, the one speed state (1ST) in 1 range is similar to that in 2 range; and, the second (2ND) state similar to that in 2 range and the three speed (3RD) state similar to that in D range can be realized, respectively, as mentioned in brackets.

Now, in the next place, another embodiment is described, wherein the present invention is applied to a four speed automatic transmission in which a three speed automatic transmission mechanism portion is employed as a partially modified automatic transmission mechanism portion.

Figure 5:
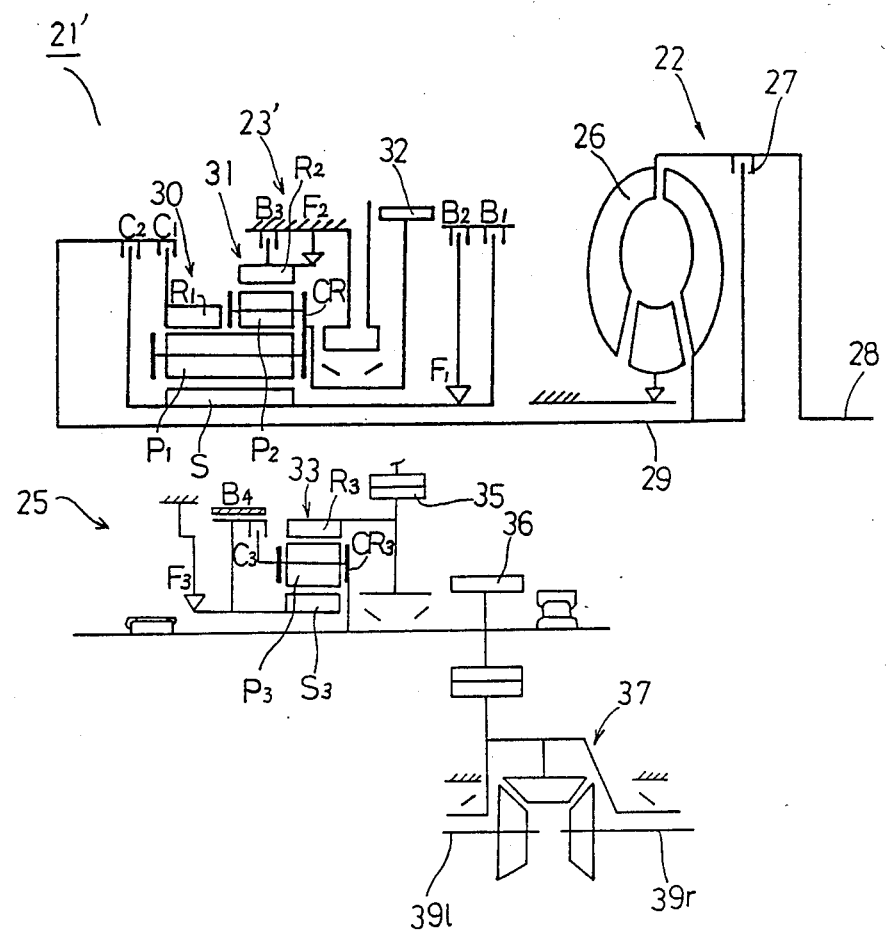
FIG. 5 is a diagramatic view of another embodiment in accordance with the present invention.

This three speed automatic transmission mechanism portion 23' is constituted such that the third clutch $C_0$ and the third one-way clutch $F_0$ are removed from the four speed automatic transmission mechanism portion 23 described above, as illustrated in FIG. 5. And the three speed automatic transmission mechanism portion 23' is combined with an underdrive mechanism 25 similar to one employed in the foredescribed embodiment, providing an automatic transmission 21' of forward four speeds. That is, as mentioned in the operation table in FIG. 6, the constitution is such that the clutch $C_0$, oneway clutch $F_0$, five speed (5TH) in D range and four speed in 3 range are removed from the foreshown FIG. 4.

Describing more particularly, the one speed state is obtained when the underdrive mechanism portion 25 is in underdrive and the three speed automatic transmission portion 23' is in one speed; and the whole transmission 21' comes to two speed when the three speed automatic transmission is up-shifted to two speed. Further, when the underdrive mechanism 25 put in direct coupling, with the three speed automatic transmission mechanism portion 23' kept in the two speed state, three speed for the whole transmission 21' is obtained. Still further, four speed for the whole transmission 21' is obtained by shifting the three speed automatic transmission mechanism portion 23' while the underdrive mechanism is kept in the direct coupling state.

By the way, said four speed automatic transmission 21' may employ the same single planetary gear unit 30, dual planetary gear unit 31 and single planetary gear unit 33 as those employed in the forementioned five speed automatic transmission 21 without any modification in themselves. In this case, the overdrive state in four speed is established by changing the gear ratios of the counterdrive gear 32 and the driven gear 35 or that of the output pinion 36, or by some other modifications like such changing.

As described above, according to the present invention; transmission stages in low speed range are obtained by shifting the main-transmission-mechanism while the sub-transmission-mechanism 25 is kept at low speed, with a low speed stage lower than a certain speed, such as two speed, of the main-transmission-mechanism 23, 23'; transmission stages in high speed range are obtained by shifting the main-transmission-mechanism while the sub-transmission-mechanism is kept at high speed, with a high speed stage higher than said certain speed of the main-transmission-mechanism; and further, an intermediate speed stage is obtained by shifting the sub-transmission-mechanism from low speed to high speed while the main-transmission-mechanism is kept at said certain speed. Therefore, the respective gear ratios of main-transmission-mechanism and sub-transmission-mechanism are matching organically with respect to each other and the optimum gear ratio for the whole transmission 21, 21' can be established, with the result that a superior running performance, a high fuel efficiency and reduced shift shocks are provided.

What is claimed is:

1. An automatic transmission comprising:
   a main-transmission mechanism including first and second clutches, a single planetary gear unit having a carrier, a sun gear and a ring gear, a dual planetary gear unit having a carrier, a sun gear and a ring gear, said respective carriers and sun gears of the single planetary gear unit and dual planetary gear unit being integrally connected together, an input member coupled with the ring gear of the single planetary gear unit through the first clutch and with the sun gears through the second clutch, said sun gears and ring gear of the dual planetary gear unit being able to be locked, and a counter drive gear connected to the carriers of the single and dual planetary gear units; and
   a sub-transmission mechanism including one planetary gear unit, a counter driven gear connected to said planetary gear unit of the sub-transmission mechanism to transmit power from the counter drive gear of the main-transmission mechanism to the planetary gear unit of the sub-transmission mechanism, and an output pinion connected to the planetary gear unit of the sub-transmission mechanism adapted to transmit power from the planetary gear unit of the sub-transmission mechanism to a differential device, said counter driven gear being situated adjacent to the output pinion between the planetary gear unit of the sub-transmission mechanism and the output pinion,
   at a low speed stage lower than a certain speed of the main-transmission mechanism, transmission edges at a low speed range being obtained by shifting the main-transmission mechanism while the sub-transmission mechanism is kept at a low speed,
   at a high speed stage higher than the certain speed of the main-transmission mechanism, transmission stages at a high speed range being obtained by shifting the main-transmission mechanism while the sub-transmission mechanism is kept at a high speed, and
   transmission stages at an intermediate speed range being obtained by shifting the sub-transmission mechanism from low speed to high speed while the main-transmission mechanism is kept at the certain speed.

2. An automatic transmission as defined in claim 1, wherein said main-transmission mechanism is a transmission mechanism of forward three speed, said certain speed of the main-transmission mechanisms being two speed, and said planetary gear unit of said sub-transmission mechanism having a ring gear connected to the counter driven gear, a carrier connected to the output pinion and a sun gear so that said sub-transmission mechanism becomes an under drive state by restraining the sun gear and a direct drive state by connecting the sun gear and the carrier.

3. An automatic transmission comprising:
   a main-transmission mechanism including first, second and third clutches, a single planetary gear unit having a carrier, a sun gear and a ring gear, a dual planetary gear unit having a carrier, a sun gear and a ring gear, said respective carriers and sun gears of the single planetary gear unit and dual planetary gear unit being integrally connected together, an input member coupled with the ring gear of the single planetary gear unit through the first clutch, coupled with the sun gears through the second clutch and coupled with the ring gear of the dual planetary gear unit through the third clutch, said sun gears and ring gear of the dual planetary gear unit being able to be locked, and a counter drive gear connected to the carriers of the single and dual planetary gear units, and
   a sub-transmission mechanism including one planetary gear unit, a counter driven gear connected to said planetary gear unit of the sub-transmission mechanism to transmit power from the counter drive gear of the main-transmission mechanism to the planetary gear unit of the sub-transmission mechanism, and an output pinion connected to the planetary gear unit of the sub-transmission mechanism adapted to transmit power from the planetary gear unit of the sub-transmission mechanism to a differential device, said counter driven gear being situated adjacent to the output pinion between the planetary gear unit of the sub-transmission mechanism and the output pinion,
   at a low speed stage lower than a certain speed of the main-transmission mechanism, transmission stages at a low speed range being obtained by shifting the main-transmission mechanism while the sub-transmission mechanism is kept at a low speed,
   at a high speed stage higher than the certain speed of the main-transmission mechanism, transmission stages at a high speed range being obtained by shifting the main-transmission mechanism while the sub-transmission mechanism is kept at a high speed, and
   transmission stages at an intermediate speed range being obtained by shifting the sub-transmission mechanism from low speed to high speed while the main-transmission mechanism is kept at the certain speed.

4. An automatic transmission as defined in claim 3, wherein said main-transmission mechanism is a transmission mechanism of forward four speed, said certain speed of the main-transmission mechanism being two speed, and said planetary gear unit of the sub-transmission mechanism having a ring gear connected to the counter driven gear, a carrier connected to the output pinion and a sun gear so that said sub-transmission mechanism becomes an under drive state by restraining the sun gear and a direct drive state by connecting the sun gear and the carrier.

* * * * *